United States Patent
Tsirkin et al.

(10) Patent No.: US 9,286,131 B2
(45) Date of Patent: *Mar. 15, 2016

(54) PROCESSOR UNPLUG IN VIRTUALIZED COMPUTER SYSTEM

(71) Applicants: Michael Tsirkin, Yokneam Yillit (IL); Dor Laor, Tel Aviv (IL)

(72) Inventors: Michael Tsirkin, Yokneam Yillit (IL); Dor Laor, Tel Aviv (IL)

(73) Assignee: Red Hat Israel, Ltd., Raanana (IL)

( * ) Notice: Subject to any disclaimer, the term of this patent is extended or adjusted under 35 U.S.C. 154(b) by 281 days.

This patent is subject to a terminal disclaimer.

(21) Appl. No.: 13/677,261

(22) Filed: Nov. 14, 2012

(65) Prior Publication Data
US 2014/0137108 A1 May 15, 2014

(51) Int. Cl.
*G06F 9/455* (2006.01)
*G06F 9/50* (2006.01)

(52) U.S. Cl.
CPC ............. *G06F 9/5077* (2013.01); *G06F 9/505* (2013.01); *G06F 9/5022* (2013.01); *G06F 2009/4557* (2013.01); *G06F 2209/5022* (2013.01)

(58) Field of Classification Search
None
See application file for complete search history.

(56) References Cited

U.S. PATENT DOCUMENTS

| | | | |
|---|---|---|---|
| 8,527,988 B1 * | 9/2013 | Rhine | 718/1 |
| 2003/0236816 A1 * | 12/2003 | Venkatasubramanian | 709/107 |
| 2005/0080753 A1 * | 4/2005 | Vega et al. | 706/21 |
| 2009/0077564 A1 * | 3/2009 | Loeser | 718/108 |
| 2010/0250868 A1 * | 9/2010 | Oshins | 711/154 |
| 2010/0332658 A1 * | 12/2010 | Elyashev | 709/226 |
| 2011/0010713 A1 * | 1/2011 | Matsumoto et al. | 718/1 |
| 2012/0278800 A1 * | 11/2012 | Nicholas et al. | 718/1 |
| 2012/0291029 A1 * | 11/2012 | Kidambi et al. | 718/1 |
| 2013/0347002 A1 * | 12/2013 | Basu et al. | 718/107 |

* cited by examiner

Primary Examiner — Kenneth Tang
(74) Attorney, Agent, or Firm — Lowenstein Sandler LLP

(57) ABSTRACT

A system and method for withdrawing virtual processors from virtual machines (VMs) are disclosed. In accordance with one embodiment, a hypervisor executed by a computer system detects when a measure of system load for a virtual machine falls below a threshold. In response, the hypervisor withdraws a virtual processor from the virtual machine.

20 Claims, 4 Drawing Sheets

PROCESSOR UNPLUG IN VIRTUALIZED COMPUTER SYSTEM

TECHNICAL FIELD

This disclosure relates to computer systems, and more particularly, to virtualized computer systems.

BACKGROUND

A virtual machine (VM) is a portion of software that, when executed on appropriate hardware, creates an environment allowing the virtualization of an actual physical computer system (e.g., a server, a mainframe computer, etc.). The actual physical computer system is typically referred to as a "host machine," and the operating system of the host machine is typically referred to as the "host operating system."

A virtual machine may function as a self-contained platform, executing its own "guest" operating system and software applications. Typically, software on the host machine known as a "hypervisor" (or a "virtual machine monitor") manages the execution of one or more virtual machines, providing a variety of functions such as virtualizing and allocating resources, context switching among virtual machines, etc.

A virtual machine may comprise one or more "virtual processors," each of which maps, possibly in a many-to-one fashion, to a central processing unit (CPU) of the host machine. Similarly, a virtual machine may comprise one or more "virtual devices," each of which maps, in either a one-to-one or one-to-many fashion, to a physical device of the host machine (e.g., a network interface device, a CD-ROM drive, etc.). The hypervisor typically manages these mappings in a transparent fashion, thereby enabling the guest operating system and applications executing on the virtual machine to interact with the virtual processors and virtual devices as though they were actual physical entities.

BRIEF DESCRIPTION OF THE DRAWINGS

The present disclosure is illustrated by way of example, and not by way of limitation, and can be more fully understood with reference to the following detailed description when considered in connection with the figures in which.

DETAILED DESCRIPTION

Figure 1:
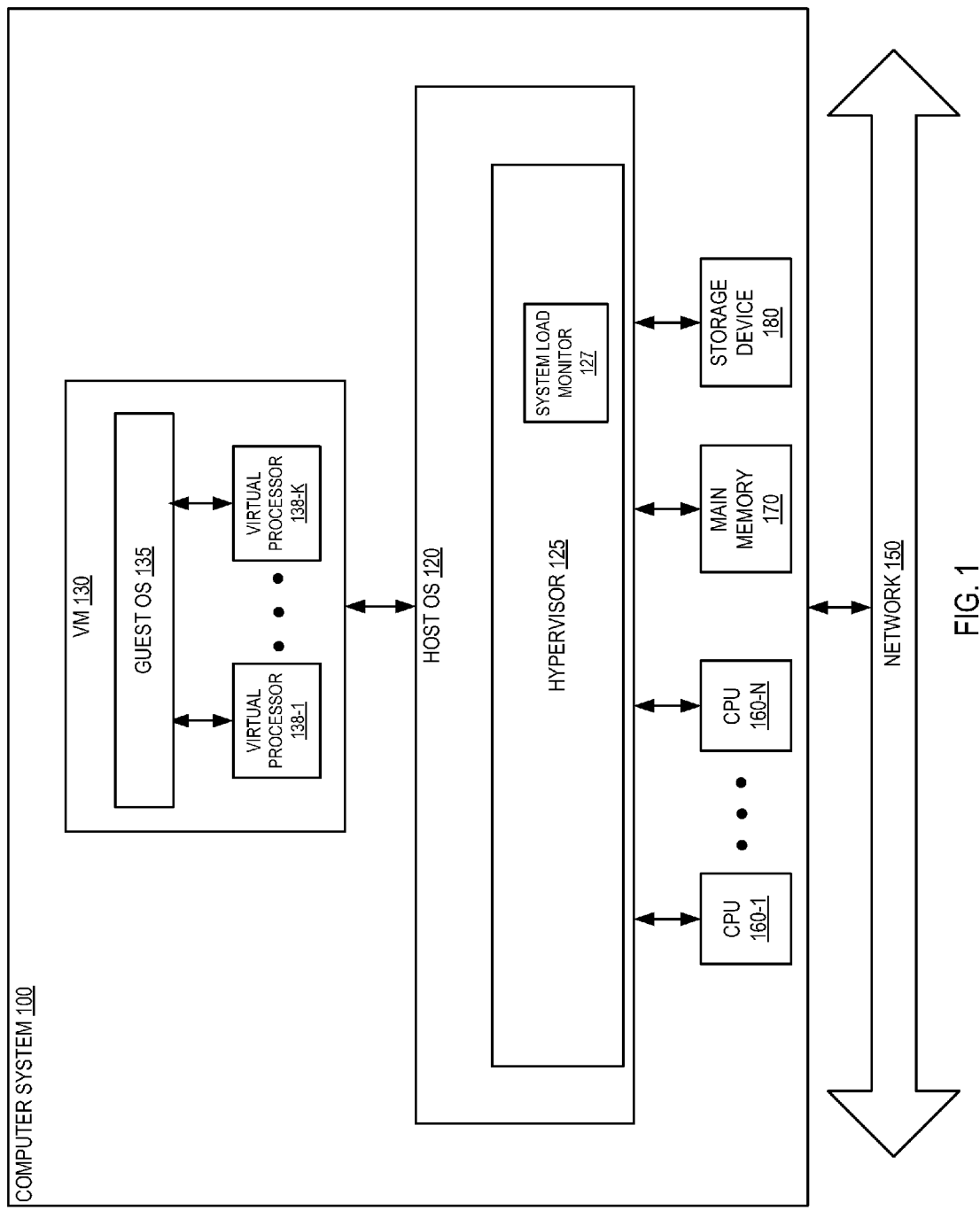
FIG. 1 depicts an illustrative computer system architecture, in accordance with an embodiment of the present disclosure.

Described herein is a system and method by which a hypervisor may withdraw a virtual processor from a virtual machine (VM), a technique referred to as "dynamic processor unplug." More particularly, in accordance with one embodiment, the hypervisor monitors one or more measures of system load, and when the hypervisor detects that a measure of system load has fallen below a threshold, the hypervisor withdraws a virtual processor from the virtual machine.

In one embodiment, the hypervisor includes a system load monitor that monitors various measures of system load, detects when a measure of system load falls below a threshold, and, when appropriate, withdraws a virtual processor from the virtual machine. It should be noted that some alternative embodiments may not employ such a system load monitor, and may instead perform these functions via some other mechanism.

In one embodiment, the measure(s) of system load may include one or more measures for a particular virtual processor of the virtual machine, or one or more measures for a set of virtual processors belonging to a particular virtual non-uniform access (NUMA) node of the virtual machine, or one or more measures for all of the virtual processors of the virtual machine, or some combination of these measures. In one embodiment, measures for a particular virtual processor may include the number of physical CPU cycles consumed executing a particular virtual processor, the number of context switches (storing and restoring the state of a processor so that execution can be resumed from the same point at a later time) per unit of time between threads executed by a particular virtual processor, the percentage of processor cycles consumed by context switches between threads executed by a particular virtual processor, the number of processes in a runnable state executing concurrently by a particular virtual processor, and so forth. Similarly, measures of system load across virtual processors belonging to a particular group (e.g., virtual processors belonging to a particular virtual NUMA node, all of the virtual processors in the virtual machine, etc.) may include the number of physical CPU cycles consumed executing virtual processors of the group, the number of context switches per unit of time between threads belonging to the same process, regardless of which virtual processor of the group executes the process; the percentage of processor cycles consumed by context switches between threads executed by the same virtual processor, regardless of which virtual processor of the group; the number of threads in a runnable state executing concurrently (e.g., the average number of threads in a runnable state executed concurrently by the virtual processors of the group, the maximum number of threads in a runnable state executed concurrently by the virtual processors of the group, etc.), and so forth.

In one embodiment, when a measure of system load is for a plurality of virtual processors, the hypervisor may select one of the virtual processors for withdrawal (e.g., the least-loaded virtual processor, etc.). Alternatively, when a measure of system load is for a single virtual processor, in one embodiment that particular virtual processor is withdrawn when the measure falls below a threshold.

Embodiments of the present disclosure are thus capable of determining when it may be advantageous to withdraw virtual processors from a virtual machines and, as a result, have those virtual processors available to improve the performance of applications executing on other virtual machines. Advantageously, embodiments of the present disclosure enable this functionality to be provided dynamically, without requiring virtual machines to be shut down and restarted. Similarly, when a virtualized computer system hosts multiple virtual machines, embodiments of the present disclosure may enable more efficient mapping of the virtual processors of the virtual machines to the physical CPUs of the system.

FIG. 1 depicts an illustrative architecture of the salient elements of a computer system 100, in accordance with an embodiment of the present disclosure. Other architectures for computer system 100 are possible, and the implementation of a computer system utilizing embodiments of the disclosure is not necessarily limited to the specific architecture depicted by FIG. 1.

As shown in FIG. 1, the computer system 100 is connected to a network 150 and comprises one or more central processing units (CPUs) 160-1 through 160-N, where N is a positive integer, main memory 170, which may include volatile memory devices (e.g., random access memory (RAM)), non-volatile memory devices (e.g., flash memory) and/or other types of memory devices, and a storage device 180 (e.g., one or more hard disk drives, solid-state drives, etc.). In some embodiments, main memory 170 may be non-uniform access (NUMA), such that memory access time depends on the memory location relative to CPUs 160-1 through 160-N.

The computer system 100 may be a server, a mainframe, a workstation, a personal computer (PC), a mobile phone, a palm-sized computing device, etc. The network 150 may be a private network (e.g., a local area network (LAN), a wide area network (WAN), intranet, etc.) or a public network (e.g., the Internet).

Computer system 100 runs a host operating system (OS) 120, which manages the hardware resources of the computer system and that provides functions such as interprocess communication, scheduling, memory management, and so forth. In one embodiment, host operating system 120 also comprises a hypervisor 125, which provides a virtual operating platform for virtual machine 130 and manages its execution. It should be noted that in some alternative embodiments, hypervisor 125 may be external to host OS 120, rather than embedded within host OS 120, or may replace host OS 120.

Virtual machine (VM) 130 is a software implementation of a machine that executes programs as though it were an actual physical machine. As shown in FIG. 1, virtual machine 130 comprises a guest operating system (OS) 135 and one or more virtual processors 138-1 through 138-K, where K is a positive integer. Guest operating system (OS) 135 comprises software that manages the execution of programs within virtual machine 130. Each virtual processor 138 is software that emulates a physical processor, and that maps to one of central processing units (CPU) 160, possibly in a many-to-one fashion. It should be noted that the number of virtual processors may or may not be the same as the number of CPUs (i.e., K may or may not equal N). In one embodiment, hypervisor 125 manages these mappings in a transparent fashion, so that hypervisor 125 and applications executing on virtual machine 130 interact with virtual processors 138 as though they were actual physical processors. It should be further noted that although, for simplicity, a single virtual machine 130 is depicted in FIG. 1, in some embodiments computer system 100 may host a plurality of VMs 130.

In accordance with one embodiment, hypervisor 125 includes a system load monitor 127 that monitors one or more measures of system load (e.g., the number of physical processor cycles consumed executing a particular virtual processor of VM 130, the number of context switches per unit of time between threads executed by VM 130, the percentage of physical processor cycles consumed by context switches between threads executed by VM 130, the number of threads in a runnable state executing concurrently, etc.) for one or more of virtual processors 138-1 through 138-K. System load monitor 127 also comprises software that detects when a measure of system load falls below a threshold, and, upon such detection, withdraws a virtual processor from virtual machine 130. Embodiments of system load monitor 127 are described in more detail below with respect to the flow diagrams of FIGS. 2 and 3.

Figure 2:
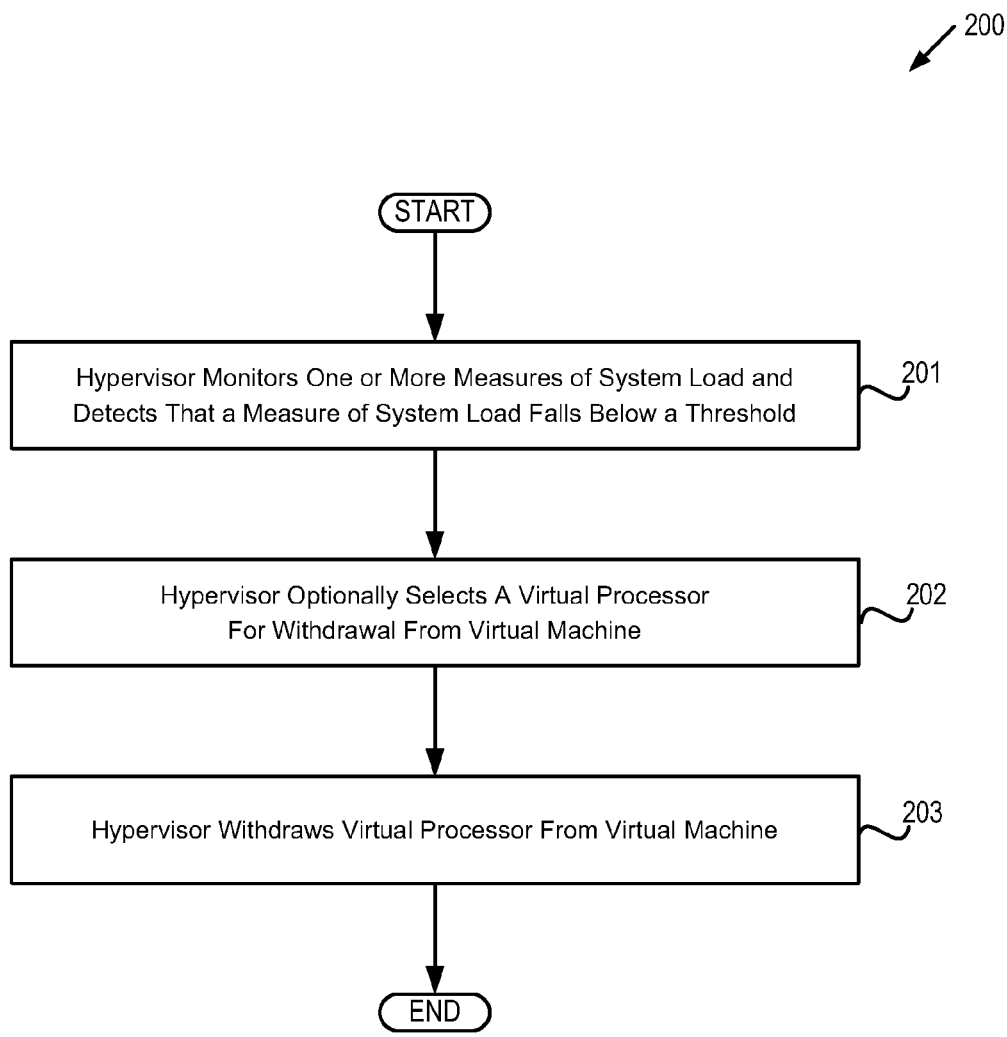
FIG. 2 depicts a flow diagram of one embodiment of a method by which a hypervisor withdraws a virtual processor from a virtual machine.

FIG. 2 depicts a flow diagram of one embodiment of a method 300 by which a hypervisor withdraws a virtual processor from a virtual machine. The method is performed by processing logic that may comprise hardware (circuitry, dedicated logic, etc.), software (such as is run on a general purpose computer system or a dedicated machine), or a combination of both. In one embodiment, the method is performed by the computer system 100 of FIG. 1, while in some other embodiments, some or all of the method might be performed by another machine. It should be noted that blocks depicted in FIG. 2 can be performed simultaneously or in a different order than that depicted.

At block 201, hypervisor 125 monitors one or more measures of system load and detects that a measure of system load has fallen below a threshold. Embodiments of operations involved in performing block 201 are described in more detail below with respect to FIG. 3. In one embodiment, block 201 is performed by system load monitor 127.

At optional block 202, hypervisor 125 selects a virtual processor 138-$i$, where i is an integer between 1 and K inclusive, for withdrawal from virtual machine 130. More particularly, when the measure of system load of block 201 pertains to a plurality of virtual processors of VM 130 (e.g., all virtual processors 138-1 through 138-K of VM 130, a set of virtual processors belonging to a virtual NUMA node of VM 130, etc.), hypervisor 125 may select one of these virtual processors for withdrawal from VM 130. In some embodiments, a least-loaded virtual processor may be selected, while in some other embodiments, some other strategy may be used to select the virtual processor (e.g., selecting a virtual processor from a least-loaded NUMA node, etc.), while in yet other embodiments a virtual processor may be selected at random. It should be noted that when the measure of system load of block 201 pertains to a single particular virtual processor, then in some embodiments, that particular virtual processor is automatically the one withdrawn from VM 130, while in some other embodiments, a different virtual processor might possibly be selected for withdrawal based on some set of one or more criteria. In one embodiment, block 202 is performed by system load monitor 127.

At block 203, hypervisor 125 withdraws a virtual processor from virtual machine 130. In embodiments in which block 202 has been executed, the virtual processor that was selected at block 202 is withdrawn from VM 130.

Figure 3:
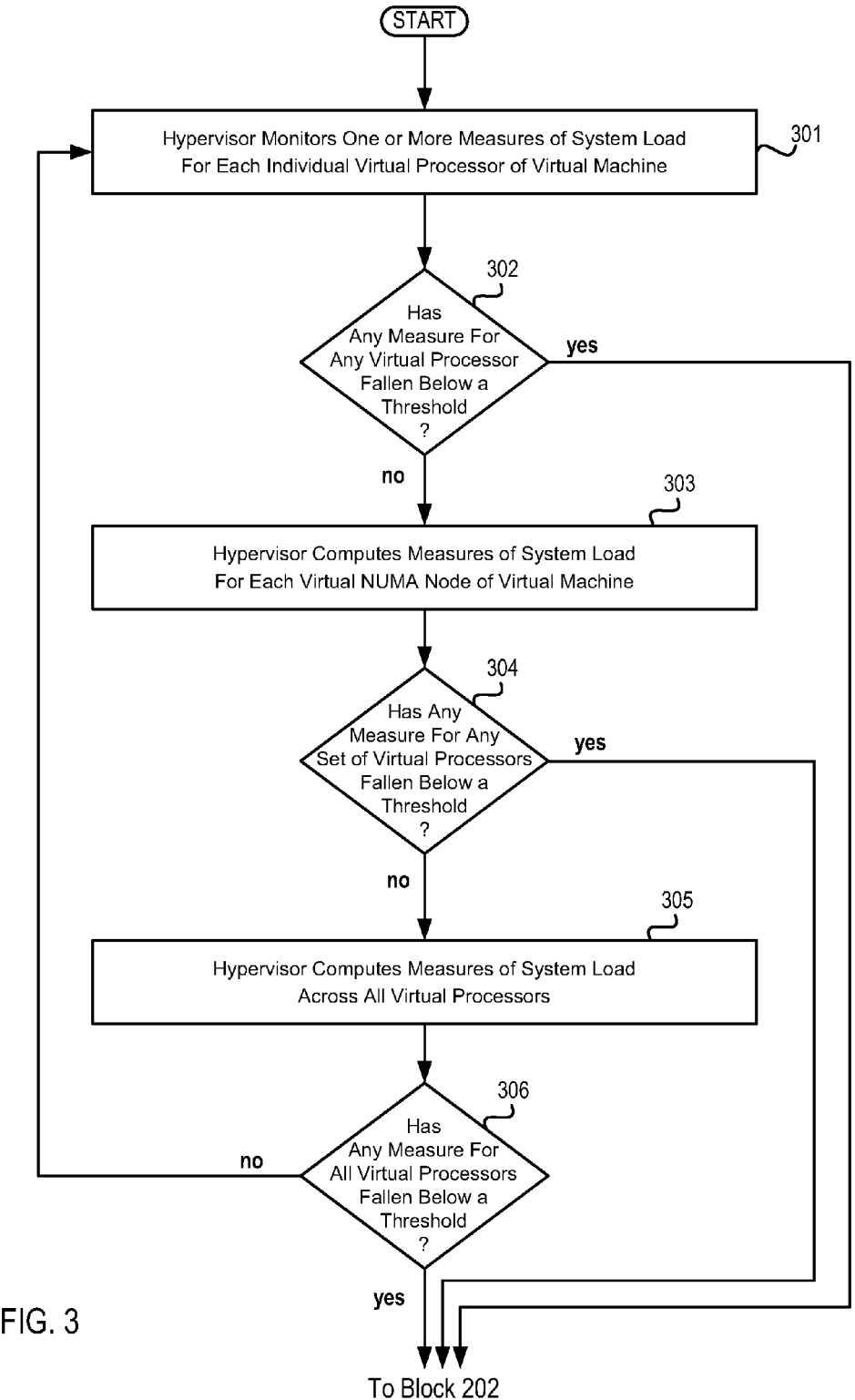
FIG. 3 depicts a flow diagram of one embodiment of a method by which a hypervisor monitors and detects system load conditions.

FIG. 3 depicts a flow diagram of one embodiment of a method by which a hypervisor monitors and detects system load conditions. It should be noted that blocks depicted in FIG. 3 can be performed simultaneously or in a different order than that depicted.

At block 301, hypervisor 125 monitors one or more measures of system load for each individual virtual processor of VM 130 (e.g., for virtual processor 160-1, for virtual processor 160-2, etc.). In some embodiments, the monitoring may comprise measuring the percentage of time during which a virtual processor is executing on a physical CPU (for example, by measuring the times at which a virtual processor starts and stops running, computing the differences of the stop and start times, summing the differences over a time interval, and dividing by the length of the time interval). In some other embodiments, the monitoring may comprise measuring the amount of time spent by hypervisor 125 executing instructions on behalf of a virtual processor, or measuring the amount of system load (e.g., disk blocks accessed, network packets sent, page faults, etc.) caused by hypervisor 125 on behalf of a virtual processor, or both. In yet other embodiments, the monitoring may comprise measuring CPU load (e.g., number of CPU cache misses, branch mispredictions, cross-NUMA node memory accesses, etc.) via one or more CPU performance counters.

In one embodiment, the measures of system load may include one or more of the following, each of which may be computed by system load monitor 127 of hypervisor 125:

- the number of physical processor cycles consumed executing a particular virtual processor;
- the number of context switches per unit of time between threads executed by a particular virtual processor;
- the number of context switches per unit of time between threads belonging to the same process executed by a particular virtual processor;
- the number of context switches per unit of time between threads belonging to different processes executed by a particular virtual processor;
- the percentage of physical processor cycles consumed by context switches between threads executed by a particular virtual processor;
- the percentage of physical processor cycles consumed by context switches between threads belonging to the same process executed by a particular virtual processor;
- the percentage of physical processor cycles consumed by context switches between threads belonging to different processes executed by a particular virtual processor;
- the number of threads in a runnable state executing concurrently by a particular virtual processor;
- the number of processes in a runnable state executing concurrently by a particular virtual processor; or
- the number of applications in a runnable state executing concurrently by a particular virtual processor.

At block 302, hypervisor 125 checks whether any measure for any of the virtual processors has fallen below a respective threshold. It should be noted that in some embodiments, the respective thresholds may be defined by an administrator via a configuration file or graphical user interface, while in some other embodiments, the respective thresholds may be hard-coded into system load monitor 127, while in yet other embodiments, the respective thresholds may be defined in some other manner. If any measure for any of the virtual processors falls below a respective threshold, then execution continues at block 302 of FIG. 2, otherwise execution proceeds to block 303.

At block 303, hypervisor 125 computes one or more measures of system load for each virtual NUMA node of VM 130 (e.g., for each set of virtual processors 138 belonging to a respective virtual NUMA node of VM 130), at least some of which may be derived from the measures monitored at block 301. In one embodiment, the measures of system load may include one or more of the following:

- the number of physical processor cycles consumed executing virtual processors of the virtual NUMA node;
- the number of context switches per unit of time between threads executed by the same virtual processor (e.g., the number of context switches per unit of time for each individual virtual processor that belongs to a given virtual NUMA node, averaged over the virtual processors belonging to the NUMA node, etc.);
- the number of context switches per unit of time between threads belonging to the same process (e.g., averaged over the virtual processors belonging to the NUMA node);
- the number of context switches per unit of time between threads belonging to different processes (e.g., averaged over the virtual processors belonging to the NUMA node);
- the percentage of physical processor cycles consumed by context switches between threads executed by the same virtual processor (e.g., the average of the percentages for each of the virtual processors belonging to the NUMA node, etc.);
- the percentage of physical processor cycles consumed by context switches between threads belonging to the same process (e.g., averaged over the virtual processors belonging to the NUMA node);
- the percentage of physical processor cycles consumed by context switches between threads belonging to different processes (e.g., averaged over the virtual processors belonging to the NUMA node);
- the number of threads in a runnable state executing concurrently (e.g., an average of the virtual processors belonging to the NUMA node, a maximum of the virtual processors belonging to the NUMA node, etc.);
- the number of processes in a runnable state executing concurrently (e.g., an average of the virtual processors belonging to the NUMA node, a maximum of the virtual processors belonging to the NUMA node, etc.); or
- the number of applications in a runnable state executing concurrently (e.g., an average of the virtual processors belonging to the NUMA node, a maximum of the virtual processors belonging to the NUMA node, etc.).

It should be noted that a NUMA node is a specific type of processor group known as a proximity domain, and that in some other embodiments, block 303 may be performed more generally for each of a plurality of proximity domains of VM 130. In one embodiment, block 303 is performed by system load monitor 127.

At block 304, hypervisor 125 checks whether any of the measures computed at block 303 has fallen below a respective threshold. If so, execution proceeds to block 302 of FIG. 2, otherwise execution proceeds to block 305.

At block 305, hypervisor 125 computes one or more measures of system load across all virtual processors of VM 130, at least some of which may be derived from the measures monitored at block 301. In one embodiment, the measures of system load may include one or more of the following:

- the number of physical processor cycles consumed executing all of the virtual processors of VM 130 (i.e., virtual processors 138-1 through 138-K);
- the number of context switches per unit of time between threads executed by the same virtual processor (e.g., the number of context switches per unit of time for each individual virtual processor, averaged over all K virtual processors, etc.);
- the number of context switches per unit of time between threads belonging to the same process (e.g., averaged over all K virtual processors);
- the number of context switches per unit of time between threads belonging to different processes (e.g., averaged over all K virtual processors);
- the percentage of physical processor cycles consumed by context switches between threads executed by the same virtual processor (e.g., the average of the percentages for each of the K virtual processors, etc.);
- the percentage of physical processor cycles consumed by context switches between threads belonging to the same process (e.g., averaged over all K virtual processors);
- the percentage of physical processor cycles consumed by context switches between threads belonging to different processes (e.g., averaged over all K virtual processors);
- the number of threads in a runnable state executing concurrently (e.g., an average of all K virtual processors, a maximum of all K virtual processors, etc.);

the number of processes in a runnable state executing concurrently (e.g., an average of all K virtual processors, a maximum of all K virtual processors, etc.); or the number of applications in a runnable state executing concurrently (e.g., an average of all K virtual processors, a maximum of all K virtual processors, etc.).

In one embodiment, block 305 is performed by system load monitor 127.

At block 306, hypervisor 125 checks whether any of the measures computed at block 305 has fallen below a respective threshold. If so, execution proceeds to block 202 of FIG. 2, otherwise execution continues back at block 301.

Figure 4:
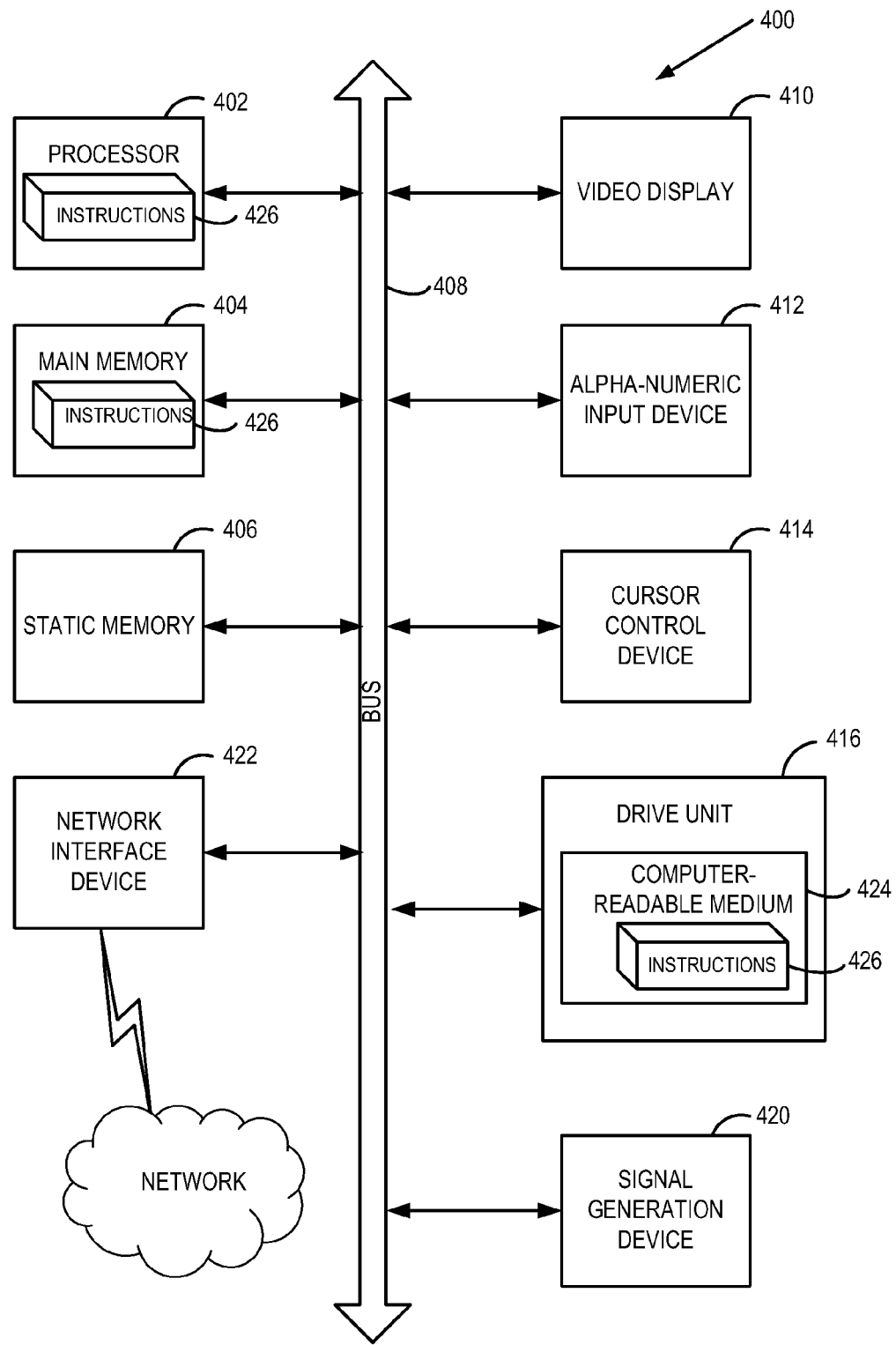
FIG. 4 depicts a block diagram of an illustrative computer system operating in accordance with embodiments of the disclosure.

FIG. 4 illustrates an illustrative computer system within which a set of instructions, for causing the machine to perform any one or more of the methodologies discussed herein, may be executed. In alternative embodiments, the machine may be connected (e.g., networked) to other machines in a LAN, an intranet, an extranet, or the Internet. The machine may operate in the capacity of a server machine in client-server network environment. The machine may be a personal computer (PC), a set-top box (STB), a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The illustrative computer system 400 includes a processor 402, a main memory 404 (e.g., read-only memory (ROM), flash memory, dynamic random access memory (DRAM) such as synchronous DRAM (SDRAM)), a static memory 406 (e.g., flash memory, static random access memory (SRAM)), and a data storage device 416, which communicate with each other via a bus 408.

Processor 402 represents one or more general-purpose processing devices such as a microprocessor, central processing unit, or the like. More particularly, the processor 402 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processor 402 may also be one or more special-purpose processing devices such as an application specific integrated circuit (ASIC), a field programmable gate array (FPGA), a digital signal processor (DSP), network processor, or the like. The processor 402 is configured to execute instructions 426 for performing the operations and steps discussed herein.

The computer system 400 may further include a network interface device 422. The computer system 400 also may include a video display unit 410 (e.g., a liquid crystal display (LCD) or a cathode ray tube (CRT)), an alphanumeric input device 412 (e.g., a keyboard), a cursor control device 414 (e.g., a mouse), and a signal generation device 420 (e.g., a speaker).

The data storage device 416 may include a computer-readable medium 424 on which is stored one or more sets of instructions 426 (e.g., instructions corresponding to the method of FIG. 2, etc.) embodying any one or more of the methodologies or functions described herein. Instructions 426 may also reside, completely or at least partially, within the main memory 404 and/or within the processor 402 during execution thereof by the computer system 400, the main memory 404 and the processor 402 also constituting computer-readable media. Instructions 426 may further be transmitted or received over a network via the network interface device 422.

While the computer-readable storage medium 424 is shown in an illustrative embodiment to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing, encoding or carrying a set of instructions for execution by the machine and that cause the machine to perform any one or more of the methodologies of the present disclosure. The term "computer-readable storage medium" shall accordingly be taken to include, but not be limited to, solid-state memories, optical media, and magnetic media.

Although the operations of the methods herein are shown and described in a particular order, the order of the operations of each method may be altered so that certain operations may be performed in an inverse order or so that certain operation may be performed, at least in part, concurrently with other operations. In another embodiment, instructions or sub-operations of distinct operations may be in an intermittent and/or alternating manner.

In the foregoing description, numerous details have been set forth. It will be apparent, however, to one skilled in the art, that embodiments of the present disclosure may be practiced without these specific details. In some instances, well-known structures and devices are shown in block diagram form, rather than in detail, in order to avoid obscuring the present disclosure.

Some portions of the detailed descriptions are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from the foregoing discussion, it is appreciated that throughout the description, discussions utilizing terms such as "receiving", "transmitting", "detecting", "withdrawing", or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The algorithms and displays presented herein are not inherently related to any particular computer or other apparatus. Various general purpose systems may be used with programs in accordance with the teachings herein, or it may prove convenient to construct more specialized apparatus to perform the required method steps. In addition, embodiments of the present disclosure are not described with reference to any particular programming language. It will be appreciated that a variety of programming languages may be used to implement the teachings of the disclosure as described herein. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus. Embodiments of the present disclosure may be provided as a computer program product, or software, that may include a machine-readable medium having stored thereon instructions, which may be used to program a computer system (or other electronic devices) to perform a process according to the present disclosure. A machine-readable medium includes any mechanism for storing or transmitting information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices, etc.), a machine (e.g., computer) readable transmission medium (electrical, optical, acoustical or other form of propagated signals (e.g., carrier waves, infrared signals, digital signals, etc.)), etc.

It is to be understood that the above description is intended to be illustrative, and not restrictive. Many other embodiments will be apparent to those of skill in the art upon reading and understanding the above description. The scope of the disclosure should, therefore, be determined with reference to the appended claims, along with the full scope of equivalents to which such claims are entitled.

What is claimed is:

1. A method comprising:
    detecting, by a hypervisor executed by a physical processor, when a measure of system load for a virtual machine falls below a threshold, wherein the measure of system load being in view of a context switch of a thread executed by a virtual processor of the virtual machine; and
    withdrawing by the hypervisor, in response to the detection, the virtual processor from the virtual machine.

2. The method of claim 1 wherein the measure of system load pertains to a plurality of virtual processors of the virtual machine.

3. The method of claim 2 further comprising selecting, by the hypervisor, the virtual processor to withdraw from the virtual machine.

4. The method of claim 3 wherein a least-loaded virtual processor of the virtual machine is selected for withdrawal from the virtual machine.

5. The method of claim 1 wherein the measure of system load pertains to a particular virtual processor of the virtual machine.

6. The method of claim 5 wherein the particular virtual processor is the virtual processor withdrawn from the virtual machine.

7. The method of claim 1 wherein a memory of the virtual machine is non-uniform memory access (NUMA), and wherein the measure of system load pertains to a set of virtual processors belonging to a particular virtual NUMA node within the virtual machine.

8. An apparatus comprising:
    a memory to store a virtual machine; and
    a physical processor operatively coupled to the memory, the physical processor to:
        execute the virtual machine;
        execute a hypervisor;
        detect, via the hypervisor, when a measure of system load for the virtual machine falls below a threshold, wherein the measure of system load being in view of a context switch of a thread executed by a virtual processor of the virtual machine; and
        in response to the detection, withdraw, via the hypervisor, the virtual processor from the virtual machine.

9. The apparatus of claim 8 wherein the measure of system load pertains to the withdrawn virtual processor.

10. The apparatus of claim 8 wherein the measure of system load pertains to all virtual processors of the virtual machine.

11. The apparatus of claim 8 wherein the measure of system load is in view of a percentage of processor cycles consumed by context switches between threads executed by the virtual machine.

12. The apparatus of claim 11 wherein the context switches are between threads belonging to different processes.

13. The apparatus of claim 11 wherein the context switches are between threads belonging to the same process.

14. The apparatus of claim 11 wherein the measure of system load is in view of a number of threads in a runnable state executing concurrently.

15. The apparatus of claim 11 wherein the measure of system load is in view of a number of processes in a runnable state executing concurrently.

16. The apparatus of claim 11 wherein the measure of system load is in view of a number of applications in a runnable state executing concurrently.

17. A non-transitory computer readable storage medium, comprising instructions stored therein, which when executed, cause a physical processor to:
    detect, by a hypervisor executed by the physical processor, when a measure of system load for a virtual machine falls below a threshold, the measure of system load being in view of a context switch of a thread executed by a virtual processor of the virtual machine; and
    withdraw by the hypervisor, in response to the detection, the virtual processor from the virtual machine.

18. The non-transitory computer readable storage medium of claim 17 wherein the measure of system load is in view of a number of context switches per unit of time between threads executed by the virtual machine.

19. The non-transitory computer readable storage medium of claim 18 wherein the context switches are between threads belonging to different processes.

20. The non-transitory computer readable storage medium of claim 18 wherein the context switches are between threads belonging to the same process.

* * * * *